United States Patent
Huang

[11] Patent Number: 6,001,907
[45] Date of Patent: Dec. 14, 1999

[54] LATEX SEALANTS CONTAINING EPOXYSILANES

[75] Inventor: Misty W. Huang, New City, N.Y.

[73] Assignee: Witco Corporation, Greenwich, Conn.

[21] Appl. No.: 09/209,141

[22] Filed: Dec. 10, 1998

Related U.S. Application Data

[63] Continuation-in-part of application No. 08/990,565, Dec. 15, 1997.
[51] Int. Cl.[6] .......................................................... C08J 5/15
[52] U.S. Cl. ............................................ 524/114; 523/177
[58] Field of Search .............................. 524/114; 523/177

[56] References Cited

U.S. PATENT DOCUMENTS

| | | |
|---|---|---|
| 4,077,932 | 3/1978 | Columbus . |
| 4,626,567 | 12/1986 | Chang . |
| 5,086,101 | 2/1992 | Garrett . |
| 5,244,950 | 9/1993 | Schlarb . |
| 5,476,896 | 12/1995 | Pereira . |
| 5,541,253 | 7/1996 | Dunaway . |
| 5,704,532 | 1/1998 | Osterholtz . |
| 5,744,544 | 4/1998 | Dunaway . |

FOREIGN PATENT DOCUMENTS

| | | |
|---|---|---|
| 1174560 | 12/1987 | Japan . |
| 9531512 | 5/1994 | WIPO . |

*Primary Examiner*—Kriellion Sanders
*Attorney, Agent, or Firm*—Edward K. Welch, II; Andrew S. Reiskind; Timothy X. Witkowski

[57] ABSTRACT

Sealant compositions comprising a latex polymer and an epoxysilane of the formula

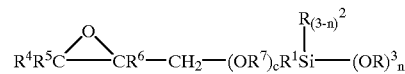

in which $R^1$ is a difunctional alkyl bridge with 2 to 6 carbon atoms, each $R^2$ group is the same or different and each is a $C_1$ to $C_{12}$ alkyl or aryl group, or a $C_1$ to $C_6$ alkoxy group each $R^3$ group is the same or different and each is a $C_2$ to $C_6$ alkyl group, n is 2 or 1, $R^4$, $R^5$, and $R^6$ are each hydrogen or a $C_1$ to $C_6$ alkyl group, $R^7$ is an alkyl group having from one to four carbon atoms, or aralkyl, or an aryl group having six to ten carbon atoms, and c has a value of zero or one;

wherein the epoxysilane is added to the polymer neat or as a non-aqueous solution.

10 Claims, No Drawings

LATEX SEALANTS CONTAINING EPOXYSILANES

This application is a C.I.P. of co-pending patent application Ser. No. 08/990,565 filed on Dec. 15, 1997.

BACKGROUND OF THE INVENTION

Organofunctional silanes have been used in latex sealant formulations as adhesion promoters. Among these applications, U.S. Pat. No. 4,626,567 to Chang teaches the use of 0.3–1% of organoaminosilane in acrylic latex based sealant formulations. Applications of organoaminosilane additives have been limited to filled and colored sealants because of the tendency of the organoaminosilane to exhibit yellowing. Non-amino containing organofunctional silanes, such as epoxysilanes, are used instead in both acrylic latex based coatings and sealants. Many efforts have been made to develop epoxysilanes as crosslinkers in the waterborne coating applications. For example, WO 9,531,512-A1 to Padget details a modified epoxysilane for more effective crosslink reaction in coating applications. Japanese patent publication JP 01174560A2 to Kimura for solvent based sealant applications, states that epoxysilane can provide polyamide based sealants with high extensibility, low modulus, and excellent adhesion to substrates.

Currently, glycidoxypropyltrimethoxysilane is used in formulations, but it suffers from several limitations. Among these are that it provides incomplete adhesion under wet conditions, especially to glass; its shelf life is short, and its adhesion properties disappear upon storage of the composition.

SUMMARY OF THE INVENTION

The present invention describes a significant improvement in obtaining wet adhesion to glass, aluminum and other substrates from latex sealants, using certain glycidoxysilanes as adhesion promoters. These epoxysilanes have slower hydrolysis rates than conventional epoxysilanes. The sealants containing these glycidoxysilanes exhibit improved extensibility and shelf stability. These properties are critical to most sealant applications.

Latex sealant formulations containing these specific epoxysilanes are shelf stable, yet can be cured at ambient temperature upon application of the sealant. The cured sealants provide excellent adhesion to glass and metal substrates. Normally addition of an epoxysilane to a sealant formulation based on a carboxy functional latex substantially reduces the elongation of that sealant. Sealant formulations containing these specific epoxysilanes show no such reduction in elongation.

One aspect of the present invention is sealant compositions comprising (a) a latex polymer containing at least one epoxy reactive functionality, and (b) a glycidoxysilane present in an amount effective to promote adhesion of the polymer to a substrate, which is added to the latex neat or in a non-aqueous solvent.

Another aspect of the invention is a method for increasing the adhesion of a latex polymer to a substrate, comprising adding a glycidoxysilane neat or in a non-aqueous solution, in an amount effective to increase said adhesion.

DETAILED DESCRIPTION OF THE INVENTION

Epoxysilanes

Epoxysilanes suitable for use in the present invention are represented by the general formula (1)

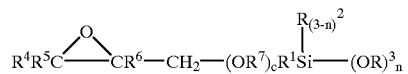

in which $R^1$ is a difunctional alkyl bridge with 2 to 6 carbon atoms, each $R^2$ group is the same or different and each is a $C_1$ to $C_{12}$ alkyl or aryl group, with methyl groups being preferred, or a $C_1$ to $C_6$ alkoxy group each $R^3$ group is the same or different and each is a $C_2$ to $C_6$ alkyl group, with ethyl and isopropyl groups being preferred, n is 1 or 2, with 2 being preferred;

$R^4$, $R^5$, and $R^6$ are each hydrogen or a $C_1$ to C6 alkyl group, $R^7$ is an alkyl group having from one to four carbon atoms, or aralkyl, or an aryl group having six to ten carbon atoms, and c has a value of zero or one.

Specific examples of these silanes are:

γ-glycidoxypropylmethyldiethoxysilane,
γ-glycidoxypropylmethyldiisopropoxysilane,
γ-glycidoxypropylmethyldiisobutoxysilane,
γ-glycidoxypropyldimethylethoxysilane,
γ-glycidoxypropylphenyldiethoxysilane, etc.

Epoxysilanes of formula (1) can be made by known synthetic techniques involving the reaction of a silane $HSiR^2{}_{3-n}(OR)^n$ with a reactant of the formula X-R* wherein R* is alkenyl containing 2 to 6 carbon atoms and possessing terminal vinylic unsaturation. The reaction proceeds under conventional conditions for the addition of the terminal carbon to the silicon of the silane.

The silanes should be used either neat or in a non-aqueous solvent, such as organic solvents, tooling agents or plasticizers. Emulsions in water of the silane have a detrimental effect on the performance of the sealant. Suitable solvent systems include, but are not limited to, mineral spirits, siloxanes, xylene, diisodecyl phthalate, diisooctyl phthalate and dioctylphthalate, etc. If in solution, the weight percent of silane should be 1 to 100.

Latex Polymers

The polymers which are useful herein include, but are not limited to, vinyls (e.g.polyvinyl chloride and polyvinylidene chloride), vinyl acrylics, acrylics (e.g., polymers of methyl methacrylate, methyl acrylate, and the like), polyurethanes, polyamides, polyepoxies, polystyrenes, polyesters, poly (vinyl alcohol), vinyl esters such as vinyl acetate, polyolefins such as polyethylene, polypropylene, and alkyds, as well as copolymers of any two (or more) thereof. The latex polymer may be prepared by any polymerization technique known in the art, such as suspension polymerization, interfacial polymerization, solution polymerization or emulsion polymerization. Emulsion polymerization of ethylenically unsaturated monomers in the presence of certain surfactants is the preferred polymerization technique for vinyl acrylic and acrylic polymers because the aqueous dispersion of latex polymer particles so formed can be used directly or with minimal work-up in preparing the compositions of the present invention. These polymerizations may be conducted by techniques well known in the art.

The latex polymer should have a glass transition temperature below 0° C. for the sealant application. The latex polymers preferably have carboxylic groups, which can react with the epoxy group on the silane when the sealant is applied. The acid number of the latex should be 5 or higher, and preferably 15 or higher. The preferred latex polymer in this invention is an acrylic based latex.

Substrates

The sealant compositions may be used with the following exemplary substrates: glass, metal, aluminum, ceramics, galvanized metals, wood, plastics is (e.g., polyvinylchloride, polystyrene, acrylics, and nylon), composites and fabrics (e.g., polyester, nylon and cotton).

Preparation of Sealant Compositions

Latex sealant formulations can be prepared by using a planetary mixer to mix together the latex polymer, the epoxysilane, and any of the typical additives which are conventionally included in sealant formulations, such as plasticizers, thickeners, biocides, tooling agents, pigments, fillers (for opaque sealants), and cure catalyst if necessary. Generally, the latex polymer, thickener, tooling agent, biocide, plasticizer, filler, and pigment are mixed for 60 to 90 minutes. Then the epoxysilane, either neat or in solution with a solvent such as mineral spirits, followed by a cure catalyst if necessary, and ammonium hydroxide for adjusting the pH of the system, are added. The mixture preferably then is stirred for an additional 15 minutes under vacuum. In the preparation of the formulations described below, this procedure was employed; there was no additional heat supplied during the mixing.

The epoxysilane can be added neat or in a non-aqueous solvent. It is preferred that the silane be premixed for at least 15 minutes with the mineral spirits or other solvent which are included in a regular sealant formulation. Aqueous silane emulsions are not preferred for use since such systems have a detrimental effect on sealant elongation. The amount of epoxysilane present in the sealant compositions of the present invention can range from 0.05 to 10% (wt.) of the latex polymer with about 0.5 to 1.5% (wt.) being preferred.

Fillers may be employed in the present invention. Suitable fillers include silica, titanate, mica, carbon black, alumina, alumina silicate, kaolin, and other metal oxides. Untreated calcium carbonates with particle sizes from about 3 to 11 micrometers are preferred. Such calcium carbonates are available under several trade names: MICROWHITE 25, SNOWFLAKE White, SNOWFLAKE PE, DURAMITE, and DRIKALITE from ECC. These fillers can be used either alone or in combination. The fillers can comprise up to 200 parts per 100 parts of the latex with 80 to 150 being the more preferred loading level.

Plasticizers also can be present in the sealant compositions of the present invention to increase flexibility and workability of the sealant. The plasticizers suitable for this sealant include phthalic esters, dibenzoates and the like. Suitable phthalic esters are available under the trade name "SANTICIZER" from Monsanto Company. Suitable benzoates are available from Velsicol Chemical Corporation as "BENZOFLEX". Plasticizers are typically added up to 25% (wt.) of the latex polymer.

An anionic, non-ionic or amphoteric surfactant, preferably non-ionic, may be present to stabilize the latex emulsion and to improve the mechanical stability of the composition. The surfactant should comprise from about 0.1 to 5% (wt.) of the latex.

A base may be used to provide the sealant with a pH of above 6 for the purpose of avoiding corrosion of the containers in which the sealant composition is packaged. Too high a pH value will detrimentally affect the shelf life of the sealants. The preferred pH range for the present invention is about 7 to 8.5. Usually 0.005 to about 0.1% of the base by weight of the total composition will be sufficient. Alkali metal or alkaline earth metal hydroxides, amines, ammonia, ammonium hydroxide and the like may be used as the base. Ammonium hydroxide aqueous solution is preferred.

A cure catalyst may be employed in the sealant formulation. It is used to accelerate curing of the sealant composition on the substrate. The need for a cure catalyst depends on the activity of the epoxysilane used and on the composition of the latex. If necessary, suitable catalysts including organotin, tertiary amine and imidazole compounds and the like can be used.

The sealant compositions of the present invention may include freeze-thaw stabilizers, colorants or pigments, pigment dispersants, anti-bacterial and/or anti-fungal preservatives, and agents for improving rheological properties such as thickeners and anti-slump agents. Those additives, when present, can comprise up to about 10% by weight of the latex.

EXAMPLES

In the tests reported in the following examples, the components were mixed together and then, after mixing, the sealants were cured at 23° C. and less than 50% relative humidity for three weeks. The physical properties of the cured sealant were then determined by testing of tensile strength, tear strength and elongation by ASTM Methods D 412 and D 624. The wet adhesion of the cured sample on different substrates was tested through 180° peel after immersion in distilled water for a week according to ASTM C 794, except the sealant was cured at 23° C. and 50% relative humidity, instead of at high temperature as described in ASTM C 794.

Epoxysilane Preparation

Example 1

Preparation of γ-Glycidoxypropylmethyldiethoxysilane

Allyl glycidyl ether (4216 grams) and chloroplatinic acid (3.4 ml,) were charged to a 1.2 liter flask. The headspace was flushed with nitrogen and the mixture was heated to 85° C. Methyldiethoxysilane (3858 grams) was added over the next 7 hours. All the methyldiethoxysilane was consumed and some unreacted, unisomerized allyl glycidyl ether remained. The crude product, which formed, was clear and yellow. The product was isolated by vacuum distillation using a 20-tray Oldershaw column (bp 110–114° C. /2 mm Hg); 4,274 grams of product were obtained (61% overall yield based on methyldiethoxysilane charge). Purity of the distilled product was 96.0% by GC.

Example 2

Preparation of γ-Glycidoxypropylmethoxydiisopropoxysilane

Into a 1 liter, three-neck flask equipped with a magnetic stirrer, addition funnel, thermometer, and a Vigreux column with distillation head, were added 250 g (1.08 mole) of γ-glycidoxypropyltrimethoxysilane, 215 g of 2-propanol, and 0.3 g of TiPt. The headspace was flushed with dry nitrogen gas and the mixture go was heated up to 88° C. to distill off the methanol produced. Additional 2-propanol was added dropwise to keep the 2-propanol content at 20–40% throughout the reaction. The final product had 80% γ-glycidoxypropylmethoxydipropoxysilane and 20% γ-glycidoxypropyltriisopropoxysilane according to NMR analysis.

Example 3

Preparation of Silane-Containing Sealant

An acrylic latex sealant was prepared from the following ingredients using the procedure described below:

TABLE I

Formulation of the Acrylic Latex

| MATERIAL | phr |
|---|---|
| Acrylic Latex[1] | 100 |
| Non-ionic surfactant[2] | 2.85 |
| Plasticizer[3] | 22.06 |
| Calcium Carbonate, 5.5μ particle size | 110.56 |
| Mineral Spirits | 5.19 |
| Product of Example 1 | 1 |
| Ammonium Hydroxide (25%) | ~0.02 |
| Other[4] | 9.29 |

[1] UCAR ® Latex 196 (65.2% solids) (Union Carbide Corp.) having pH of 6.1, $T_g = -22°$ C., acid number of about 20.
[2] Octoxynol-40 70% active.
[3] Butyl benzyl phthalate.
[4] Freeze-thaw stabilizer, biocide, thickener, titanium oxide and pigment dispersant.

The sealant composition was prepared by charging the acrylic latex and the surfactant to a mixer. The biocide, freeze-thaw stabilizer, thickeners, pigment dispersant, plasticizer, calcium carbonate and titanium oxide were added while mixing. The above ingredients were mixed for about 1 hour. An aqueous solution of 5% ammonium hydroxide and the pre-mixed silane of Example 1 with mineral spirits were charged. The blend was mixed for additional 15 minutes under vacuum to obtain Sealant I. The pH of the composition was between 8.2–8.4.

Sealant II was prepared by using the same procedure employed to prepare Sealant I, except that the silane of Example 2 was used in place of the silane of Example 1.

Comparative Sealant III incorporated γ-glycidoxypropyltrimethoxysilane as the epoxysilane. Comparative Sealant IV incorporated β-(3,4-epoxycyclohexyl)-ethyltrimethoxysilane in the formulation instead of the silane prepared in Example 1. Comparative Sealant V incorporated 2.5 phr of emulsified β-(3,4-epoxycyclohexyl)ethyltriethoxysilane (40% silane) as an adhesive promoter. Comparative Sealant VI was made in the same procedure as the above sealants except no epoxysilane was incorporated.

The mechanical properties (tensile strength, elongation, modulus, hardness and tear strength) and 180° peel strength of the sealant were measured and the results are listed in the following tables:

TABLE II

Mechanical Properties of Sealants I, II, III, IV, V, and VI

| Sealant | Tear Strength (N/mm) | Elongation (%) | Tensile strength (MPa) | Young's Modulus (MPa) | Hardness Shore A |
|---|---|---|---|---|---|
| I | 8.0 | 321 | 1.12 | 0.31 | 38 |
| II | 8.5 | 301 | 1.43 | 0.62 | |
| III (C) | 8.6 | 179 | 1.35 | 1.05 | 38 |
| IV (C) | 10.4 | 242 | 1.97 | 1.18 | 45 |
| V (C) | 9.6 | 256 | 1.88 | 0.83 | 47 |
| VI (C) | 6.1 | 306 | 0.53 | 0.41 | 37 |

TABLE III

Wet Peel Strength of Sealants I, II, III, IV, V and VI

| Sealant | Substrates | Peel Strength (N/mm) | Failure |
|---|---|---|---|
| I | Glass | 2.03 | 80% CF |
| | Aluminum | 2.54 | CF |
| II | Glass | 1.63 | CF |
| | Aluminum | 2.12 | CF |
| III (C) | Glass | 0 | AF |
| | Aluminum | 1.19 | AF |
| IV (C) | Glass | 0.28 | AF |
| | Aluminum | 0.79 | AF |
| V (C) | Glass | 0.47 | AF |
| | Aluminum | 1.85 | CF |
| VI (C) | Glass | 0 | AF |
| | Aluminum | 0.88 | AF |

CF—Cohesive failure
AF—Adhesion failure

TABLE IV

Shelf Stability of Epoxysilane-containing Sealants

| Sealant | Load Level (phr) | Visicosity[2] (cps) Initial | After Aging |
|---|---|---|---|
| Example 1 | 1 | 176,000 | 264,000 |
| Emulsified β-(3,4-epoxycyclohexyl)-ethyltriethoxysilane (C) | 1 | 168,000 | 228,000 |
| γ-Glycidoxypropyl-trimethoxysilane (C) | 0.5 | 160,000 | 304,000 |
| None | 0 | 184,000 | 280,000 |

[1] Shelf life was checked by change of the sealant's viscosity before and after storage at 50° C. oven for 4 weeks.
[2] Viscosity of the sealant was measured by Brookfield viscometer (HB series) at speed of 20 rpm using spindle T-D. The measurement was conducted at room temperature.

TABLE V

Wet Peel Strength of the Sealants After Four Weeks Storage @ 50° C.

| Silane | Sealant | Substrates | Peels Strength (N/mm) | Failure |
|---|---|---|---|---|
| Example 1 | I | Glass | 2.47 | CF |
| | | Aluminum | 1.35 | CF |
| Emulsified β-(3,4-epoxycyclohexyl)-ethyltriethoxysilane | V (C) | Glass | 0.12 | AF |
| | | Aluminum | 0.63 | AF |
| γ-Glycidoxypropyl-trimethoxysilane (C) | III (C) | Glass | 0 | AF |
| | | Aluminum | 0.77 | AF |
| None | VI (C) | Glass | 0 | AF |
| | | Aluminum | 0.80 | AF |

Tables III and V illustrate the wet peel strength of the sealant with various epoxysilanes before and after four weeks storage at 50° C. Comparative Sealant V containing emulsified β-(3,4-epoxycyclohexyl)ethyltriethoxysilane showed improved adhesion to aluminum initially, but not to glass. It did not improve the adhesion of the aged samples. Comparative Sealants III and IV showed sporadic adhesion during the tests. Only the sealants incorporating epoxysilanes having a moderate rate of hydrolysis and condensation presented in this invention, such as γ-glycidoxypropylmethyldiethoxysilane in Sealant I and γ-glycidoxypropylmethoxydiisopropoxysilane in Sealant II, consistently offer excellent wet peel strength to both glass and aluminum, which meets the requirements of ASTM C 920 for sealants. Sealant I exhibits improved wet adhesion even after four weeks storage at 50° C.

Table II summarizes the mechanical performances of the sealants. Normally epoxysilanes render improved tensile strength, modulus, and tear resistance of the sealants, and reduce the elongation at the same time. However, the epoxysilanes of the present invention gave Sealant I and Sealant II a relatively low modulus and an elongation as high as the sealant which did not contain silanes. This improvement is important to sealants used for joint compound application.

Table IV compares the shelf stability of the sealants containing epoxysilanes. The viscosity of all sealant samples after aging was slightly higher than the initial value because of loss of water during the accelerated aging.

Nevertheless, the sealants containing the silane of Example 1 showed shelf stability equivalent to the sealant, which did not contain silane.

Sealants VII–VIII

Sealants using the silane of Example 1 were used in latex formulations according to Table I above, except that the effect of pre-mixing the glycidoxysilane with mineral spirits (Sealant VII) versus combining the mineral spirits and the glycidoxysilane together in the latex formulation (Sealant VIII) were tested. The results in Table VI show that the order of addition did not make a distinction in this regard.

TABLE VI

Comparison of Silane Mixed with or without Mineral Spirit:

| Sample | Tensile Str. (MPa) | Elongation (%) | Youngs Modulus (MPa) | Tear resist (N/mm) | Shore A Hardness | Peel strength (N/mm) |
|---|---|---|---|---|---|---|
| VII | 36.1 | 247 | 18.7 | 7.3 | 44 | 2.2 |
| VIII | 36.9 | 269 | 19.4 | 8.8 | 40 | 1.9 |

* The peel strength was measured on aluminum plates. They failed cohesively.

Examples of Unsuccessful Emulsified Glycidoxypropyl Methyldimethoxysilane

The following example show that emulsions of a sterically hindered epoxysilanes, such as the Example 1 and 2, cannot be made and so the emulsions should not be used in latex formulations.

Example A—Comparative

Into a beaker were added SPAN®60 surfactant (0.3171 g) and TWEEN® surfactant (0.6429g), which were heated together in a hot water bath in order to melt the solid materials. Glycidoxypropylmethyldiethoxysiane (4.8g) was added and the mixture was stirred with a mechanical stirrer. Water (6.24g) was added and the mixture was stirred vigorously for approximately thirty minutes. The resulting product lumped and was light gray.

Example B—Comparative

Into a beaker were added SPAN®60 surfactant (1.6066g) and MYRJ® 52S surfactant (2.373g), which were heated together in a hot water bath to melt the solid materials. Glycidoxypropylmethyldiethoxysiane (20 g) was added and the mixture was stirred with a mechanical stirrer. Water (26 g) was added and the mixture was stirred vigorously for approximately thirty minutes to provide white emulsion. The emulsion was not stable. It phase separated in two weeks.

What is claimed is:

1. A sealant composition comprising
a latex polymer and
an epoxysilane represented by the general formula (1)

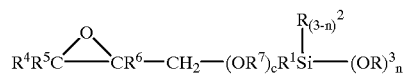

In which
$R^1$ is a difunctional alkyl bridge with 2 to 6 carbon atoms,
each $R^2$ group is the same or different and each is a $C_1$ to $C_{12}$ alkyl or aryl group, with methyl groups being preferred, or a $C_1$ to $C_6$ alkoxy group
each $R^3$ group is the same or different and each is a $C_2$ to $C_6$ alkyl group, with ethyl and isopropyl groups being preferred,
n is 1 or 2;
$R^4$, $R^5$, and $R^6$ are each hydrogen or a $C_1$ to $C_6$ alkyl group,
$R^7$ is an alkyl group having from one to four carbon atoms, or aralkyl, or an aryl group having six to ten carbon atoms, and
c has a value of zero or one;
wherein the silane is added neat or as a non-aqueous solution to the latex polymer.

2. A sealant composition according to claim 2 wherein each $R^2$ is methyl and n=2.

3. A sealant composition according to claim 2 wherein each $R^3$ is ethyl or isopropyl.

4. A sealant composition according to claim 1 wherein each $R^3$ is ethyl or isopropyl.

5. A sealant composition according to claim 1 wherein the epoxysilane comprises 0.05 to 10 weight % of the latex polymer.

6. A sealant composition according to claim 5 wherein the latex polymer is acrylic latex.

7. A method for increasing the adhesion of a latex polymer to a substrate, wherein the latex polymer contains epoxy reactive groups, comprising adding to the polymer an epoxysilane represented by the general formula (1)

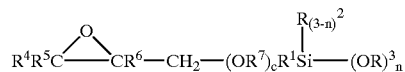

in which
$R^1$ is a difunctional alkyl bridge with 2 to 6 carbon atoms,
each $R^2$ group is the same or different and each is a $C_1$ to $C_{12}$ alkyl or aryl group, with methyl groups being preferred, or a $C_1$ to $C_6$ alkoxy group
each $R^3$ group is the same or different and each is a $C_2$ to $C_6$ alkyl group, with ethyl and isopropyl groups being preferred,
n is 1 or 2;
$R^4$, $R^5$, and $R^6$ are each hydrogen or a $C_1$ to $C_6$ alkyl group,
$R^7$ is an alkyl group having from one to four carbon atoms, or aralkyl, or an aryl group having six to ten carbon atoms, and
c has a value of zero or one;
wherein the silane is added neat or as a non-aqueous solution to the latex polymer.

8. A method according to claim 7 wherein the epoxysilane is combined with a non-aqueous solvent prior to addition to the latex polymer.

9. A method according to claim 8 wherein each $R^3$ is ethyl or isopropyl, n=2, and $R^2$ is methyl.

10. A method according to claim 9 wherein the substrate is selected from the group consisting of: glass, metal, ceramics, galvanized metals, wood, plastics, composites and fabrics.

* * * * *